US008589094B2

(12) United States Patent
Giglio et al.

(10) Patent No.: US 8,589,094 B2
(45) Date of Patent: Nov. 19, 2013

(54) GLOBAL TRIP UNIT

(75) Inventors: Carmine Giglio, Louisville, KY (US); Todd Greenwood, Louisville, KY (US); Marcelo Esteban Valdes, Plainville, CT (US); Nataniel Barbosa Vicente, Louisville, KY (US); Craig B. Williams, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1118 days.

(21) Appl. No.: 12/549,454

(22) Filed: Aug. 28, 2009

(65) Prior Publication Data

US 2011/0054713 A1    Mar. 3, 2011

(51) Int. Cl.
*G01R 15/14* (2006.01)

(52) U.S. Cl.
USPC ................. 702/58; 361/93.1; 361/42; 361/45

(58) Field of Classification Search
USPC ................. 702/58; 361/93.1, 42, 45
See application file for complete search history.

(56) References Cited

U.S. PATENT DOCUMENTS

| 4,245,318 | A | | 1/1981 | Eckart et al. |
|---|---|---|---|---|
| 4,271,444 | A | | 6/1981 | Howell |
| 4,566,053 | A | | 1/1986 | Strickland, Jr. |
| 4,752,853 | A | | 6/1988 | Matsko et al. |
| 5,875,088 | A | * | 2/1999 | Matsko et al. ................. 361/96 |
| 5,969,921 | A | | 10/1999 | Wafer et al. |

* cited by examiner

*Primary Examiner* — Jonathan C Teixeira Moffat
*Assistant Examiner* — Hien Vo
(74) *Attorney, Agent, or Firm* — Global Patent Operation; Stephen G. Midgley

(57) ABSTRACT

A method of setting a ground fault trip response function for a trip unit includes enabling a ground fault protection mode for the trip unit, setting the ground fault trip response function for the trip unit, wherein the ground fault trip response function is a double knee time current function.

16 Claims, 9 Drawing Sheets

GLOBAL TRIP UNIT

BACKGROUND OF THE INVENTION

The exemplary embodiments of the invention generally relate to ground fault sensing devices and more particularly to setting a ground fault trip response function (shape of the response) in a trip unit or other overcurrent protective device with automatic or controlled operation.

Circuit breakers are used for protecting electrical conductors such as cables and bus bars in equipment. The circuit breaker trip mechanism monitors current through an electrical conductor and "trips" the circuit breaker to open the electrical circuit to interrupt current flow through the circuit provided that certain predetermined criteria are met. The circuit breaker may, of course, also be used to monitor voltage, and trip in case of any disturbance in pre-set voltage conditions such as under-voltage, over-voltage, and voltage imbalance conditions. Other trip criteria can include, for example, the maximum continuous current permitted in the protected circuit.

Overcurrent protective functions are usually designed as inverse time functions with a "pickup" threshold and a response curve that relates how much over the threshold current the monitored current is, and how long it lasts over the threshold current. A monitored current that is only slightly above a threshold current may be allowed to continue longer than a current that greatly exceeds the threshold current value. As long as the monitored current remains below any protection rating (long-time, short-time, ground fault, or instantaneous), the circuit breaker will remain closed.

An electronic trip unit ("ETU") is a device that is used in conjunction with an electro-mechanical circuit breaker to control the current (or voltage) versus time trip response. The time current curve characteristics define the trip time and currents permitted by the circuit breaker. Circuit breaker characteristics can be set by the user via a variety of threshold (pickup) settings and response shaping parameters to provide a specific inverse time protective function, also referred to herein as the "time current curve". As long as the monitored current remains below the various threshold settings and the associated time current curve characteristics, the circuit breaker or overcurrent device will remain closed. Momentary low magnitude-excursions above the threshold (pickup) settings are tolerated as governed by the time current curve characteristics or response function associated with the pickup settings. However, persistent overcurrents, or currents in excess of threshold settings that last long enough to engage the time current curve will result in the tripping of the circuit breaker.

Circuit breakers are designed to trip on this basis so as not to trip in response to normal, momentary currents which flow, for example, during motor starting or transformer energization. Overload current responses of fuses and overload relays are also predicated on an inverse-time basis. Circuit protective devices, including circuit breakers, are also designed to respond to overcurrents of short circuit proportions, e.g., ten times rated current, on an instantaneous basis, that is, without intentional delay. A typical circuit breaker clearing time, i.e., the maximum time taken by the breaker to physically open its contacts and interrupt short circuit currents, is typically in the range of eight to fifty milliseconds.

Intermediate the overload and short circuit overcurrent ranges is a heavy overload current range, e.g. three to ten times rated current, which is typically handled on a fixed time delay basis. That is, circuit interruption in response to heavy overload current levels is effected upon the expiration of a predetermined fixed short time delay. This portion of the protection may be designed as a "definite time" function, which means that once the threshold is exceeded the response is strictly dependant on time, not current magnitude. Alternatively, the response may have an inverse time response characteristic. The most common example of this inverse time response characteristic is referred to as an "$I^2t$ slope" defined by the function {Time to trip=$k/I^2$}, where k is a constant that defines the location of the slope on the time-current curve.

Once an electrical power distribution system has been designed, its loads and operating conditions defined, and the voltages and electrical equipment selected, it remains to determine the appropriate circuit protective devices to be used. The primary concern in this determination is to prevent or at least minimize damage to the conductors within the distribution system, and possibly connected loads, in the event of a fault or overload precipitating abnormal overcurrent condition. Such a fault may be caused by equipment failure, human error, or emergencies of natural origin. Typically, such faults are unpredictable, and thus the selected circuit protective devices must function automatically to isolate the fault from the rest of the system, minimize damage to conductors and adjacent equipment or conductors and, incidentally, to minimize hazard to other property and personnel that may be in physical proximity to the fault location.

Another principal concern associated with the determination of the circuit protective devices to be used is to minimize the extent and duration of electrical service interruption in the event of a fault. In all but the simplest systems, there are two or more circuit protective devices between a fault and the source of the fault current. In order to minimize electrical service interruption, overcurrent protective devices feeding the faulted circuit should respond in a particular order. The device feeding the faulted circuit closest to the fault should trip to minimize unnecessary power interruption to other portions of the power distribution system. If, for any reason, this protective device does not clear the fault in timely fashion, the next upstream protective device will attempt to do so in a back-up role, and so on. A series of overcurrent protective devices selected and set to provide this "selective" mode of operation is said to be "selectively coordinated". To achieve such coordination the protective devices must be selected and set on the basis of their particular time current curve response characteristics so as to operate on the minimum current that will enable them to fully carry both steady state and transitory rated circuit current while responding to undesirable levels of current as quickly as possible. Each device should operate in the minimum time possible and yet be selective, i.e., coordinate, with other devices in series therewith. When these two requirements are met, damage to the system and service interruption are minimized. However, in many cases some level of compromise between optimal selectivity and optimal protection must be accepted. Engineers practiced in the art of selecting and setting circuit breakers and associated trips are often called to determine how much selectivity to compromise to achieve better protection, or visa versa.

Conventional electric circuits normally carry balanced electrical currents, with the return current from an electrical load flowing through a neutral conductor. Unless a ground fault current is flowing, the phase and neutral currents of a branch circuit sum to zero. In the event of a ground fault, the phase and neutral currents do not sum to zero, and the difference between the phase and neutral currents is the ground fault current.

One type of ground fault that may not be sufficiently well protected by normal trip unit overcurrent functions is a fault type known as an "arcing ground fault". Arcing ground faults may have some specific characteristics that make them particularly damaging and difficult to detect via normal sensing designed for phase overcurrent protection. An arcing ground fault current is one that involves current flowing through air causing ionization of the same air allowing current to flow. This "arc" may create sufficient impedance in the form of resistance to keep the fault current relatively low. This low, but still damaging, current may be difficult to detect unless the overcurrent protective device trip systems employs a specific ground fault protective function.

The ground fault protective function is conventionally executed by measuring the individual phase currents and the neutral current of a circuit and summing the measured currents to identify any difference between the phase and neutral currents. A single current transformer, such as a "zero-sequence" transformer is conventionally used to measure the phase and neutral currents and identify any differential or ground fault current. Once the ground current is measured it may be compared to its own dedicated pickup threshold settings and ground-fault inverse time overcurrent function which is different from the similar function assigned to the phase conductor protection. Typically the ground-fault protection is set to be more sensitive than phase protection. Several industry standards such as NFPA 70 (a.k.a. National Electrical Code [NEC]) and UL 1053 strictly regulate when dedicated ground fault protection must be implemented within a power distribution system and various parameters that define required sensitivity and operating time constraints for ground-fault protection.

The constraints described within the various standards create significant complexity and provide for significant limitations for the "selectivity" described as desirable in the previous sections of this document. Traditional ground fault overcurrent response shapes do not provide sufficient flexibility to optimize protection and selectivity while still adhering to the performance limitations created by applicable standards. It would be advantageous to provide greater curve shaping flexibility than is currently available in the industry to meet all of these conflicting requirements, as well as the applicable standards.

BRIEF DESCRIPTION OF THE INVENTION

As described herein, the aspects of the disclosed embodiments overcome one or more of the above or other disadvantages known in the art.

One aspect of the disclosed embodiments relates to a method of setting a ground fault trip response function for a trip unit that includes enabling a ground fault protection mode for the trip unit, setting the ground fault trip response function for the trip unit, wherein the ground fault trip response function is a double knee time current function.

Another aspect of the disclosed embodiments relates to a ground fault trip unit for an electrical circuit current interrupter. A ground fault sensing unit is configured to be operatively coupled to the electrical circuit current interrupter. The ground fault sensing unit is further configured to detect a ground fault current and a trip device is operatively coupled to the ground fault sensing unit. The trip device is configured to interrupt current flow in the electrical circuit according to a double-knee time-current trip function in response to the ground fault.

In a further aspect, the disclosed embodiments are directed to a system for monitoring an electric circuit for a ground fault condition. In one embodiment the system includes a trip unit including a central processor, the central processor being operatively coupled to a ground fault sensor, a user interface adapter, and at least one memory device having stored thereon at least one set of instructions which, when executed by the processor causes the system to monitor an electrical circuit for a ground fault condition, and interrupt the electrical circuit upon sensing the ground fault condition based on a trip function, the trip function comprising at least one double knee time current function, the at least one double knee time current function being set in the processor though the user interface.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE INVENTION

Figure 1:
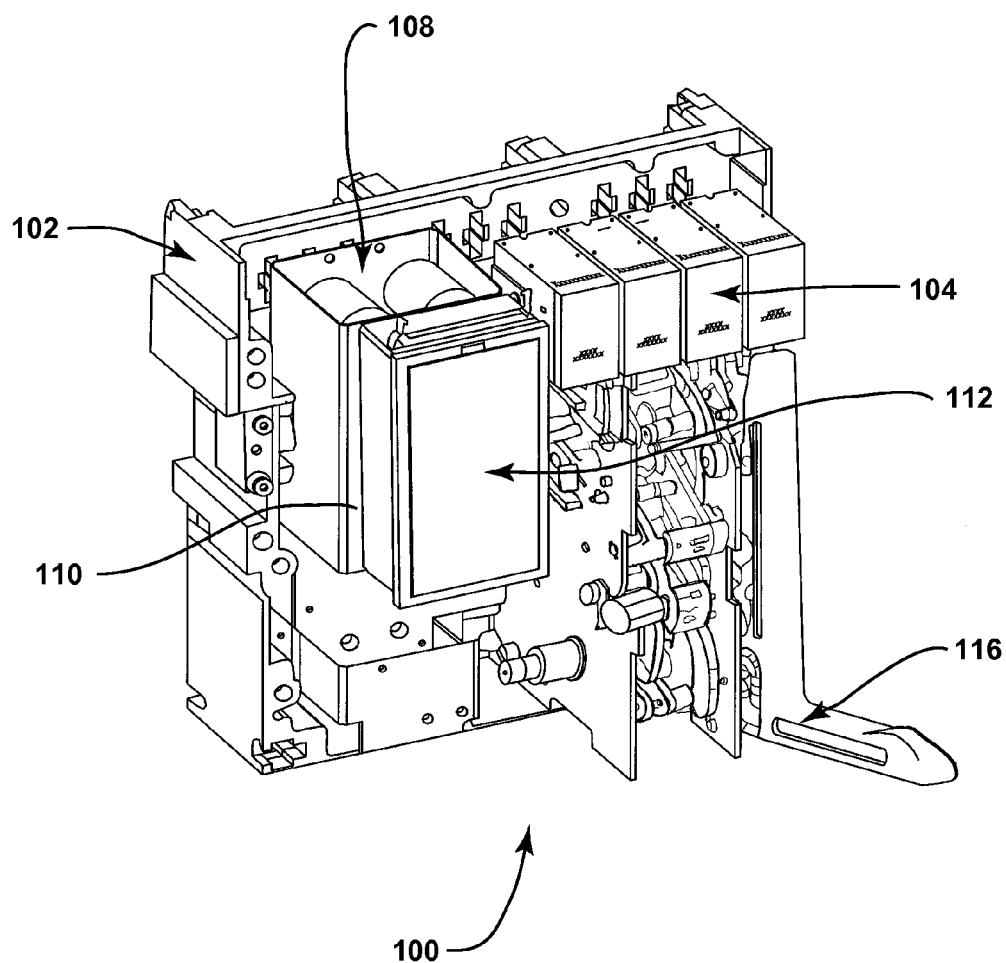
FIG. 1 is a block diagram of a circuit breaker device incorporating aspects of the disclosed embodiments.

FIG. 1 illustrates an exemplary ground fault sensing device 100, such as for example, a circuit breaker assembly, incorporating aspects of the disclosed embodiments. The aspects of the disclosed embodiments generally apply a modified ground fault algorithm for the creation of time current curves in a ground fault-sensing device that provides for the ground fault-sensing device to trip in a specified time at a predetermined current level, such as for example, two (2) seconds at 150% rated current. The modified algorithm also allows molded case circuit breakers as large as 800 A to be selectively set below a 1200 A service entrance ground fault setting and provides improved coordination with other protective functions.

As shown in FIG. 1, the ground fault sensing device 100, referred to herein as a "circuit breaker assembly" generally comprises a number of mechanical devices mounted onto a breaker frame 102 including user installable accessories 104. In one embodiment, a manual trip lever 106 may be operated by the user to manually control the flow of electric current through the circuit breaker. Also shown in FIG. 1 is a breaker mounting unit 108 attached to the frame 102, and attached to the front of the breaker-mounting unit 108 is a breaker mounting plate 110.

The circuit breaker assembly 100 also includes an electronic trip unit 112, also referred to herein as a "global trip unit." The electronic trip unit module 112 is generally configured to provide flexibility in the creation of time current curves and allow for the creation of a time current curve that will satisfy a requirement for the ground fault-sensing device 100 to trip in a specified time at a predetermined current level, such as for example in two (2) seconds at 150% rated current, as well as meet other requirements. The electronic trip unit 112 is mechanically and electronically attached to the circuit breaker assembly 100. In alternate embodiments, any suitable circuit breaker assembly incorporating an electronic trip unit can be used.

Figure 2:
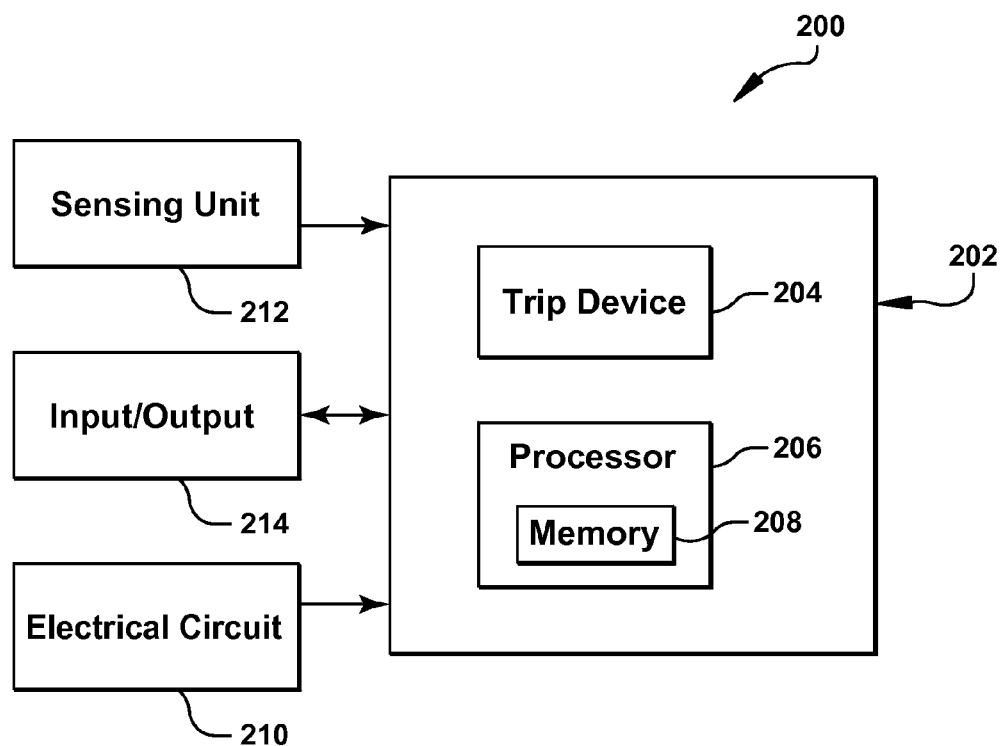
FIG. 2 is a schematic illustration of a trip unit incorporating aspects of the disclosed embodiments.

FIG. 2 illustrates a block diagram of one embodiment of a system 200 for monitoring an electrical circuit for ground faults. The system 200 generally includes a circuit interrupter trip unit 202 having a trip device 204 and at least one processor 206. The processor 206, which can include a microprocessor, for example, can have one or more memory modules 208 associated therewith. The trip unit 202 is operatively coupled to one or more electrical/electronic circuits 210 and ground fault sensing unit(s) 212. The ground fault sensing unit 212, also referred to herein as a "trip unit" or "global trip unit" is generally configured to monitor the electrical circuit 210 for electrical faults, such as leakages to ground. Upon sensing a fault condition, the sensing unit 212 signals the processor 206 to activate the trip device 204 and interrupt the electrical current flow to and/or in the electrical circuit 210. In one embodiment, the electrical circuit 210 can be coupled to one or more trip units 202 that can selectively interrupt electrical current flow to or within the electrical circuit 210.

The trip device 204 is generally configured to interrupt the current flow in the electrical circuit 210 based on a trip characteristic established by a ground fault trip function. The ground fault trip function employed can be predefined and selectable to address the protection requirements for the electrical circuit 210.

In one embodiment, the trip unit 202 is coupled to a user interface, or other such input/output device 214, that allows a user to define the operating parameters and ground fault trip function for the trip unit 202, as well as receive information from, and send information to, the trip unit 202. The operating parameters are used to establish the desired response and trip times of the trip unit 202, as well as provide coordination with other upstream and down stream ground fault sensing devices, such as for example circuit breakers. The input/output device 214 can also be configured to provide and receive other suitable data input and output functions related to the operation of the system 200.

Figure 3:
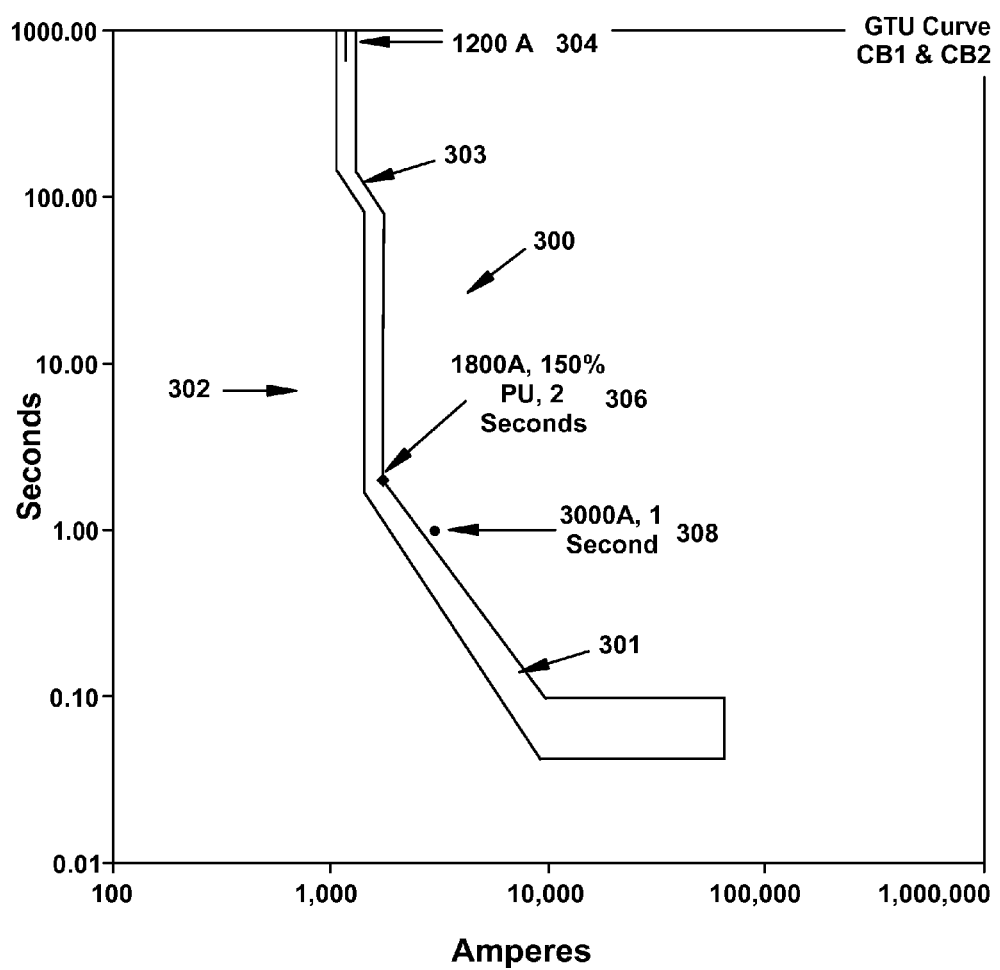
FIG. 3 is a graph illustrating the modified $I^2T$ ground fault algorithm of the disclosed embodiments plotted on a logarithmic scale.

The aspects of the disclosed embodiments provide for applying a modified ground fault algorithm to the trip unit 202 that will cause the trip device 204 to trip in a specified time at a predetermined current level, such as for example approximately two (2) seconds at 150% rated current. The modified ground fault algorithm of the disclosed embodiments generates a "double knee" response curve that the trip unit 204 and sensing unit 212 use for detecting a ground fault condition that requires the trip device 204 to be activated. One example of time current-curve of the disclosed embodiments is shown in FIG. 3.

The time current curve 300 of the disclosed embodiments is a "double knee response curve." Unlike a traditional ground fault time current curve, the double knee response curve 300 includes two sloped regions, lower sloped region 301 and upper sloped region 303. The shape of the double knee response curve 300 is sufficiently flexible to meet the noted NEC and UL standards, while allowing the most area to the left side 302 of the curve 300. For example, point 304 on the time-current curve 300, at 1200 Ampere, represents the maximum pickup setting threshold or maximum nominal pickup allowed by the current NEC standards. In alternate embodiments, this, and the other points referenced in the figures, can be varied to comply with the current or other suitable standards or requirements. Point 306, at 1800 A, 2 seconds, represents the maximum clearing time currently allowed by UL 1053, as a function of pickup settings. Point 308, at 3000 A, 1 second, represents the maximum clearing time allowed under NEC requirements, regardless of pickup setting. In alternate embodiments, the maximum pickup setting threshold, maximum clearing time as a function of pickup settings and the maximum clearing time points referred to above, can be set or adjusted according to any desired requirements or standards.

Figure 4:
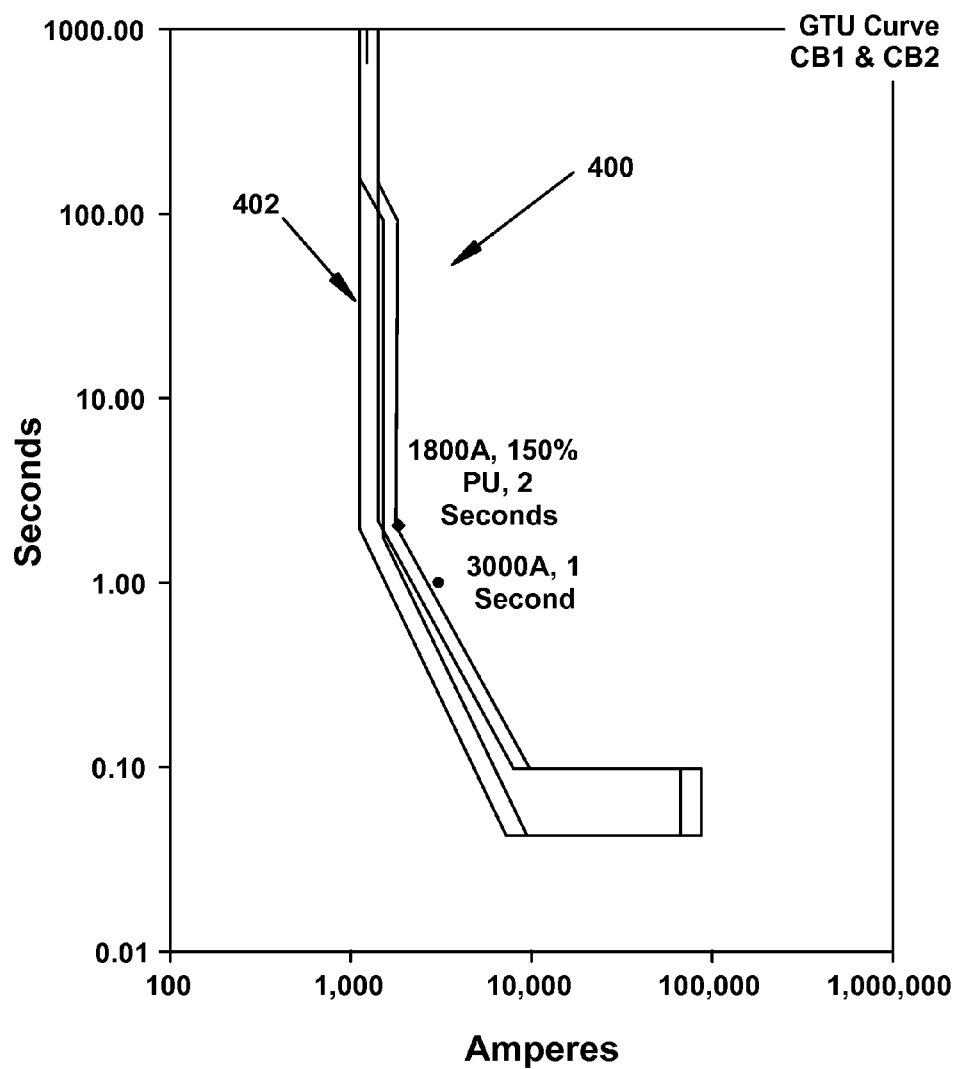
FIG. 4 is an example of a non-double knee response curve according to the disclosed embodiments.

Without the dual knee feature of the disclosed embodiments, as in a traditional ground fault time current curve 400 shown in FIG. 4, the vertical portion 402 of the time current curve 400 is limited by the 1200 A maximum pickup setting allowed by the NEC. However, the dual knee response curve 300 shown in FIG. 3. is sufficiently flexible to meet the 1200 A maximum pickup setting, the 150% clearing time requirement, and the 3000 A clearing time requirement for the respective NEC and UL standards.

In a conventional ground fault function $I^2t$ algorithm for accumulator heating, Trip Time=$k/I^2$, and K is a constant. The aspects of the disclosed embodiments modify the K values in the ground fault $I^2t$ algorithm for accumulator heating, and create the double knee response curve 300 shown in FIG. 3. Unlike the conventional ground fault function, where Trip Time=$k/I^2$, and K is a single constant, there are two (2) separate and unequal K values ($K_{Upper}$ and $K_{Lower}$) for the double knee response curve characteristic of the disclosed embodiments. For example, as shown in FIG. 3, the lower slope 301 uses a different "K" value than the upper slope 303. The value of "K" is defined variably via a relationship to the maximum pickup setting, which in the examples described herein is 1200 A, and is represented by the equation: Trip Time=$K \times (\text{pickup/maximum pickup setting})^2/I^2$. In alternate embodiments, the value of K can be variable with respect to any desired or allowed maximum nominal pick-up setting value. Thus, while K may be one of several values, it is varied within the exemplary Trip Time equation used herein by the variable (pickup/maximum pickup setting)$^2$, where the maximum pickup setting used herein is 1200 A.

In the example shown with respect to FIG. 3, the two K values are calculated as follows:

$$K_{Upper} = 150$$

$$K_{Lower} = C*((\text{Sensor/PGF})/(\text{maximum pickup setting})/I^2$$

where:

C=Slope Location Factor. The Slope Location Factor is a value that fixes the location of the slope at the maximum clearing time desired, and can be determined in respect of additional factors such as tolerance and mechanical time. In the examples used herein, for a 1200 A setting, the Slope Location Factor is determined to be 3.2, or in the range of approximately 3.1 to 3.3. In alternate embodiments, the value of C can be any suitable value that fixes the location of the slope on the curve.

Sensor=sensor value (in Amps)

PGF=Pickup setting for Ground Fault

Maximum Pickup Setting=1200 A

The (Sum of Squares) SOS current value at which the curve transition from $K_{Upper}$ to $K_{Lower}$ occurs is determined by the following transfer function:

ITransition=PickupThreshold*(1.3)2

Therefore, if the Ground Fault SOS current value is greater than the PickupThreshold and less than or equal to the ITransition value, the value used for K in all calculations is $K_{Upper}$. If the Ground Fault SOS current value is greater than the ITransition value and less than the HeatingAddend value, the value used for K in all calculations is $K_{Lower}$. The HeatingAddend value is defined as follows:

HeatingAddend=$K_{Lower}$*(PickupThreshold/Tau), where Tau=1/Band Constant.

There will be two values for the accumulator threshold as well. When the Ground Fault SOS current value is less than or equal to ITransition, the equation will be as follows:

AccumulatorThreshold=2*$K_{Upper}$*f*PickupThreshold

When the Ground Fault SOS current value is greater than ITransition, the equation will be as follows:

AccumulatorThreshold=2*$K_{Lower}$*f*PickupThreshold

Whenever the accumulator requires heating, another determination will have to be made before the accumulator can be adjusted correctly. If IGF2 is less than HeatingAddend and IGF2 is less than 10× the rated current:

Acc=Acc+IGF2

Otherwise:

Acc=Acc+HeatingAddend

Whenever the value of the accumulator is greater than or equal to the AccumulatorThreshold value, a trip is issued or an alarm is generated based on which protection algorithm is being performed (trip or alarm).

Figure 5A:
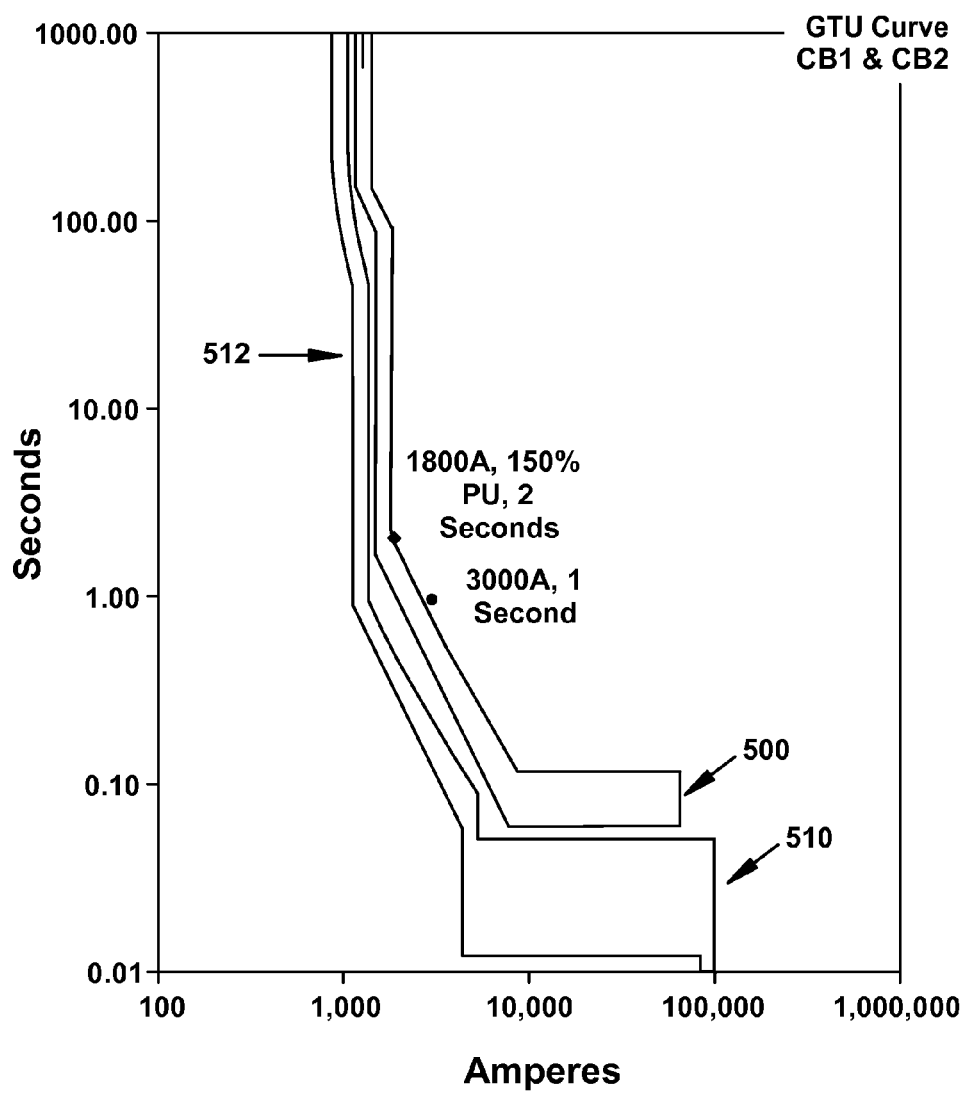
FIGS. 5A, 5B, 6A and 6B illustrate the selective application of downstream and upstream circuit breaker functions using both a double knee and traditional ground fault function.
Figure 5B:
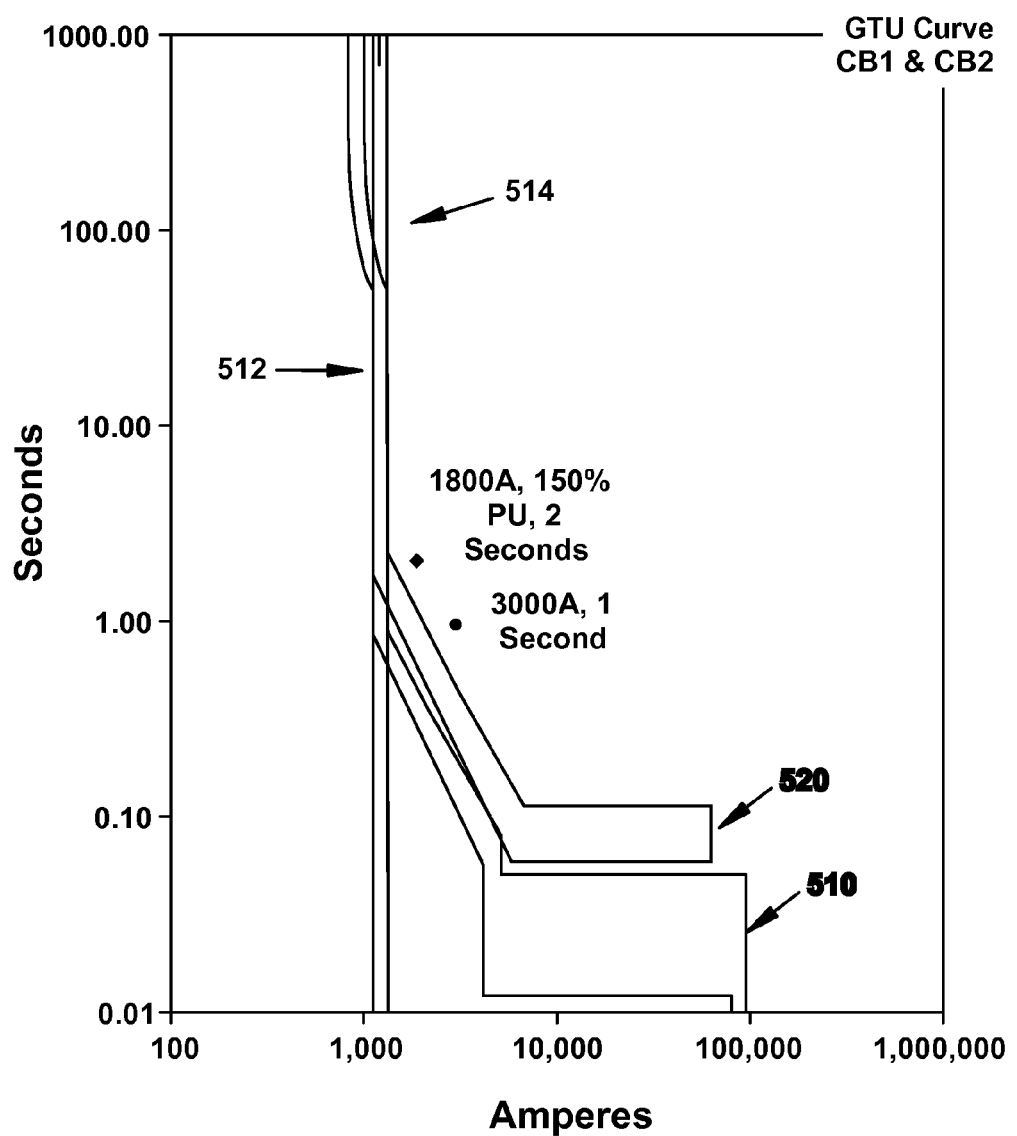

FIG. 5A illustrates how a relatively large circuit breaker phase overcurrent protection (curve 510) can be set to be "selective" with an upstream circuit breaker's ground fault function 500, if the ground fault function 500 employs the double knee response feature of the disclosed embodiments. If the double knee feature of the disclosed embodiments is not used, as shown in FIG. 5B, the long time delay portion 512 of curve 510 overlaps the traditional ground fault function curve 520. The vertical portion 514 of the curve 520, centered at 1200 A, is defined by standard, and cannot be changed other than as shown in the double knee response curve 500 of FIG. 5A.

Figure 6A:
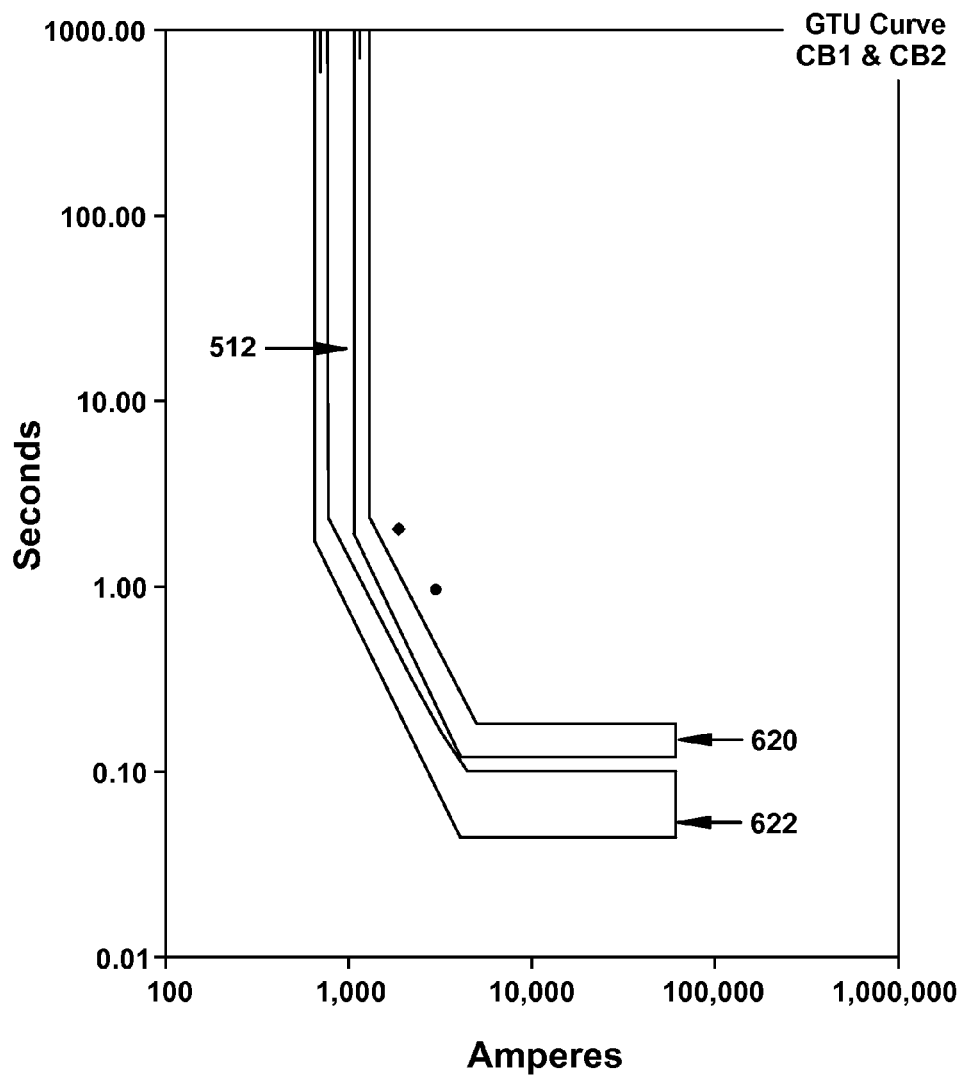

To achieve selectivity, trip response times of circuit breakers must be set such that they do not overlap for equal values of sensed current. The traditional ground fault time current curves 620, 622 shown in FIG. 6 are selective because they do not overlap, i.e. there is a space 624 between the two curves. In order to achieve selectivity, curve 622, to the left, has to be set at a lower threshold. How much lower is driven by the width and position of the lower slope, know as the $I^2T$ slope. In this example, the circuit breaker represented by curve 620 is set at 1200 A. The other circuit breaker, represented by curve 622, is set at 720 A, or 60% of curve 620.

Figure 6B:
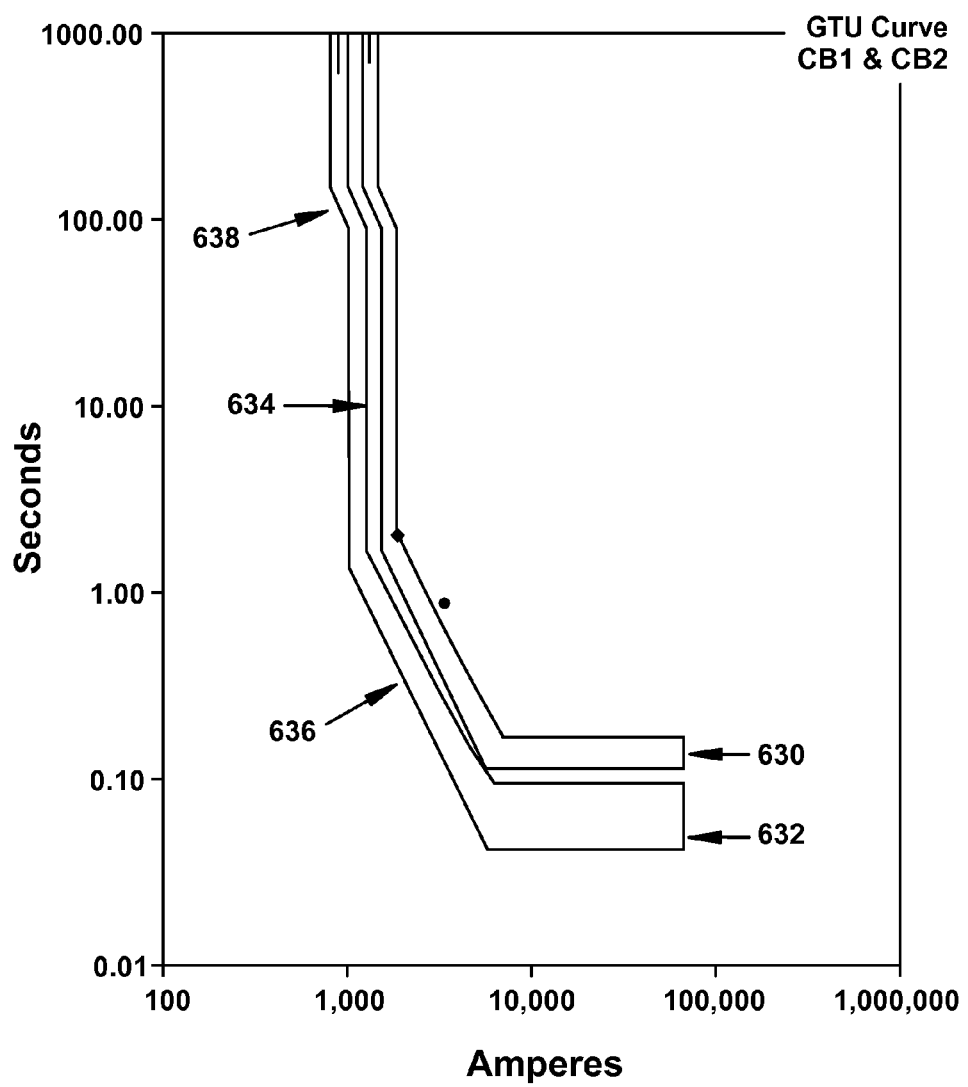

In the example shown in FIG. 6B, the pair of circuit breakers, represented by the double knee response curves 630 and 632, are also selective. The curve 630 to the right is set at 1200 A. However, the curve 632 to the left is set at 820 A, which is higher than curve 622 of FIG. 6A. This is possible, because, in accordance with the aspects of the disclosed embodiments, the lower slope 636 of curve 632 uses a different value of "K" that the upper slope 638 in the trip time calculation, which as noted above is defined by the equation Trip Time=K×(pickup/maximum pickup setting)$^2$/$I^2$, where then maximum pickup setting used in these examples is 1200 A.

Varying the "K" value within the trip time equation by the variable (pickup/1200)$^2$, allows the "fatter" or "wider" lower slope 636 of the curve 632 to shift to the left so that the pair of ground fault functions, represented by curves 630, 632, are selective, with less leftward shift of the smaller ground fault pickup setting. This accounts for the visibly smaller gap 634 between the respective vertical portions of the curves 630, 632, than is seen with respect to curves 620 and 622 of FIG. 6A.

Figure 7:
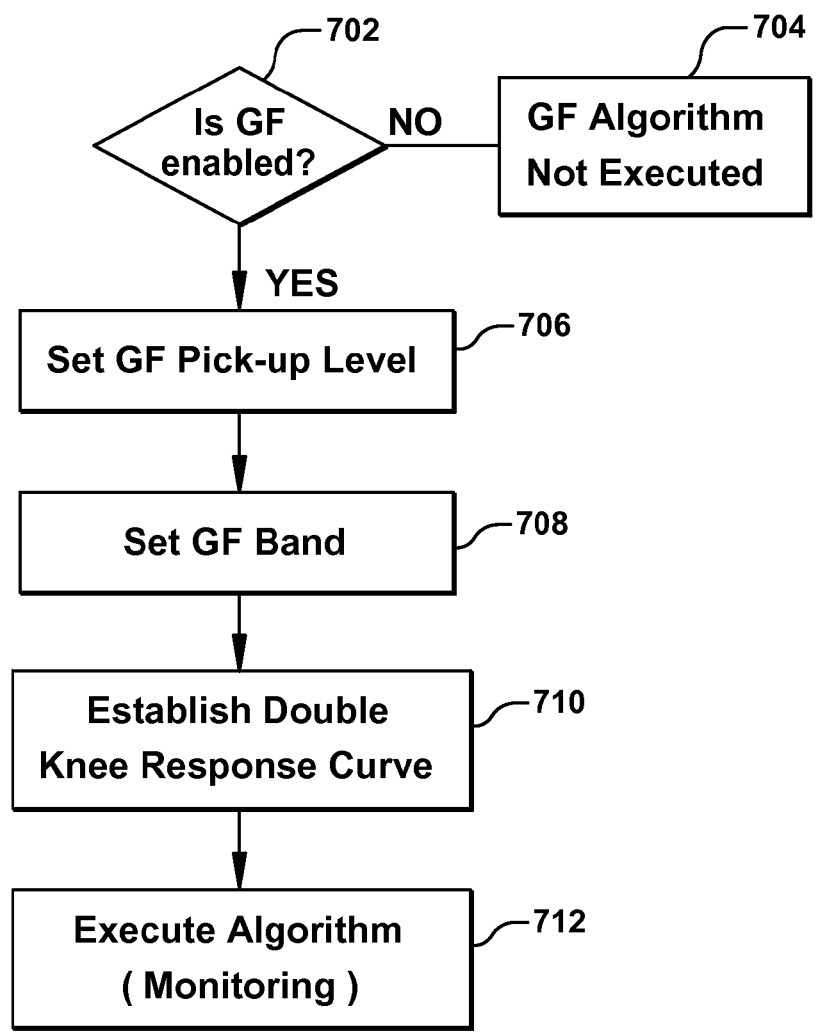
FIG. 7 is a flowchart illustrating a method incorporating aspects of the disclosed embodiments.

FIG. 7 illustrates one example of a process flow incorporating aspects of the disclosed embodiments. Initially, a determination 702 is made whether ground fault protection is enabled for trip unit 202 of FIG. 2. If ground fault protection is not enabled, the monitoring algorithm is not executed 704. If however, ground fault protection is enabled, a ground fault pick up level or threshold is established 706. In one embodiment, ground fault pickup can generally be between 0.1 and 1 milliamps depending on breaker sensor parameters. After selecting the ground fault pickup threshold, a ground fault band is selected 708.

Once the ground fault band is selected 708, a ground fault trip function or slope is established 710, which, in accordance with the disclosed embodiments, is a double knee response curve. Once the particular trip function is established 710, the monitoring algorithm is executed 712 and the trip unit 202 of FIG. 2 is enabled to provide ground fault protection in accordance with the disclosed embodiments for electrical circuit 210.

The disclosed embodiments may also include software and computer programs incorporating the process steps and instructions described above. In one embodiment, the programs incorporating the process steps described herein can be stored on or in a computer program product and executed in one or more computers. The system 200 of FIG. 2 can include computer readable program code means stored on a computer readable storage medium for carrying out and executing the process steps described herein. In one embodiment the computer readable program code is stored in a memory 208 of the system 200. In alternate embodiments the computer readable program code can be stored in memory or memory medium that is external to, or remote from, the system 200. The memory can be direct coupled or wireless coupled to the system 200. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips. The system 200 may also be linked to one or more computer systems and are capable of sending information to each other and receiving information from each other over any suitable type of communication channel.

The aspects of the disclosed embodiments create a new curve characteristic for ground fault protection. By creating a double knee characteristic and curve transition using two or more values of K in the described algorithm, the ground fault sensing device is capable of tripping in a specified time at a predetermined current level, such as for example two (2) seconds at 150% of the rated current. The algorithm of the disclosed embodiments also preserves the expanded protective features of the global trip unit, such as for example, allowing molded circuit breakers as large as 800 A to be selectively set below a 1200 A service entrance ground fault setting. Also, there is better coordination with other protective functions, such as long time over current. The flexibility of the global trip unit of the disclosed embodiments allows the user to create the curve shape that best suits the specific system needs, Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of setting a groan(fault trip response function for a trip unit, the method comprising:
    enabling a ground fault protection mode for the trip unit;
    setting the ground fault trip response function for the trip unit wherein the ground fault trip response function is a double knee time current function;
    wherein setting the trip response function for the trip unit further comprises applying a modified $I^2T$ inverse time function that has an upper value of $K_{upper}$ where $K_{upper}$=150, and a lower value of $K_{Lower}$, where $K_{Lower}$=(Slope location factor) * ((Sensor/PGF)/ Maximum Pickup Setting)/$I^2$, Sensor=sensor value (in Amps) and PGF=Pickup setting for Ground Fault.

2. The method of claim 1 wherein the trip response function for the trip unit has a 1200 Ampere maximum pickup setting and a 3000 Ampere, 1 second clearing time.

3. A method of setting a ground fault trip response function for a trip unit, the method comprising:
    enabling a ground fault protection mode for the trip unit;
    setting the ground fault trip response function for the trip unit wherein the ground fault trip response function is a double knee time current function;
    wherein the double knee time current function defines a lower slope portion having a first K value and an upper slope portion having a second K value, wherein the first K value and second K value are not equal; and
    wherein the trip response function is defined by the relationship Trip Time=K×(pickup/maximum pickup setting)$^2$/$I^2$.

4. The method of claim 3 wherein the maximum pickup setting is 1200 Amperes.

5. The method of claim 3 wherein the trip response function for the trip unit is a two (2) second trip time at 150% of rated sensor current.

6. A ground fault trip unit fur an electrical circuit current interrupter comprising:
    a ground fault sensing unit configured to be operatively coupled to the electrical circuit current interrupter, the ground fault sensing unit further configured to detect a ground fault current; and
    a trip device operatively coupled to the ground fault sensing unit, the trip device configured to interrupt current flow in the electrical circuit according to a double-knee time-current trip function in response to the ground fault;
    wherein the trip response function is defined by the relationship Trip Time=K×(pickup/maximum pickup setting)$^2$/$I^2$.

7. The trip unit of claim 6 further comprising that the double knee time current function defines a lower slope portion having a first K value and an upper slope portion having a second K value, wherein the first K value and second K value are different.

8. The trip unit of claim 6 wherein the maximum pickup setting is 1200 Amperes.

9. The trip unit of claim 6 wherein a trip time of the trip unit is about two (2) seconds at 150% of rated sensor current.

10. A ground fault trip unit for an electrical circuit current interrupter comprising;
    a ground fault sensing unit configured to be operatively coupled to the electrical circuit current interrupter, the ground fault sensing unit further configured to detect a ground fault current;
    a trip device operatively coupled to the ground fault sensing unit, the trip device configured to interrupt current flow in the electrical circuit according to a double-knee time-current trip function in response to the ground fault;
    wherein the trip response function for the trip unit comprises a modified $I^2T$ inverse time function that has an upper value of $K_{Upper}$, where $K_{Upper}$=150 and a lower value of $K_{Lower}$, where $K_{Lower}$=(Slope Location Factor) * ((Sensor/PGF)/Maximum Pickup Setting)/$I^2$, Sensor=sensor value (in Amps) and PGF=Pickup setting for Ground Fault.

11. The trip unit of claim 10 wherein the trip function for the trip unit is defined by a 1200 Ampere maximum pickup setting and a 3000 Ampere, 1 second clearing time.

12. A system for monitoring an electric circuit for a ground fault condition comprising:
    a trip unit including a central processor. the central processor being operatively coupled to:
    a ground fault sensor;
    a user interface adapter; and
    at least one memory device having stored thereon at least one set of instructions which, when executed by the processor causes the system to:
    monitor an electrical circuit for a ground fault condition; and
        interrupt the electrical circuit upon sensing the ground fault condition based on a trip function the trip function comprising at least one double knee time current function, the at least one double knee time current function being set in the processor though the user interface;
    wherein the trip response function for the trip unit comprises a modified $I^2T$ inverse time function that has an upper value of $K_{upper}$, where $K_{upper}$=150 and a lower value of $K_{lower}$, where $K_{Lower}$=(Slope Location Factor) *((Sensor/PGF)/ Maximum Pickup Setting/$I^2$, Sensor=sensor value (in Amps) and PGF=Pickup setting for Ground Fault.

13. The system according to claim 12 wherein the trip unit has a two (2) second tripping time at 150% of rated sensor current.

14. A system for monitoring an electric circuit for a ground fault condition comprising:
- a trip unit including a central processor, the central processor being operatively coupled to:
- a ground fault sensor;
- a user interface adapter; and
- at least one memory device having stored thereon at least one set of instructions which, when executed by the processor causes the system to:
- monitor an electrical circuit for a ground fault condition; and
  - interrupt the electrical circuit upon sensing the ground fault condition based on a trip function, the trip function comprising at least one double knee time current function, the at least one double knee time current function being set in the processor though the user interface;
- wherein the double knee time current function defines a lower slope portion having a first K value and an upper slope portion having a second K value, wherein the first K value and second K value are not equal;
- wherein the trip response function is defined by the relationship Trip Time=K×(pickup/maximum pickup setting)$^2$/I$^2$.

15. A ground fault trip unit for an electrical circuit current interrupter comprising:
- a ground limit sensing unit configured to be operatively coupled to the electrical circuit current interrupter, the ground fault sensing unit further configured to detect a ground fault current;
- a trip device operatively coupled to the ground fault sensing unit, the trip device configured to interrupt current flow in the electrical circuit according to a double-knee time-current trip function in response to the ground fault;
- wherein the trip function response is defined by the relationship Trip Time=K×(pickup/maximum pickup setting)$^2$/I$^2$.

16. The trip unit of claim 15 further comprising that the double knee time current function defines a lower slope portion having a first K value and an upper slope portion having a second K value, wherein the first K value and second K value are different.

* * * * *

UNITED STATES PATENT AND TRADEMARK OFFICE
CERTIFICATE OF CORRECTION

PATENT NO.        : 8,589,094 B2
APPLICATION NO.   : 12/549454
DATED             : November 19, 2013
INVENTOR(S)       : Giglio et al.

It is certified that error appears in the above-identified patent and that said Letters Patent is hereby corrected as shown below:

In the Claims

In Column 9, Line 32, in Claim 1, delete "groan(fault" and insert -- ground fault --, therefore.

In Column 9, Line 66, in Claim 6, delete "fur" and insert -- for --, therefore.

In Column 10, Line 21, in Claim 9, delete "a. trip" and insert -- a trip --, therefore.

In Column 10, Line 24, in Claim 10, delete "comprising;" and insert -- comprising: --, therefore.

In Column 10, Line 46, in Claim 12, delete "processor." and insert -- processor, --, therefore.

In Column 10, Line 56, in Claim 12, delete "function" and insert -- function, --, therefore.

In Column 10, Line 65, in Claim 12, delete "Setting/$I^2$," and insert -- Setting)/$I^2$, --, therefore.

In Column 12, Line 6, in Claim 15, delete "limit" and insert -- fault --, therefore.

Signed and Sealed this
Eighth Day of April, 2014

Michelle K. Lee
*Deputy Director of the United States Patent and Trademark Office*